(Model.)
J. S. BRADFORD.
Implement for Gathering Potatoes.
No. 240,650.        Patented April 26, 1881.
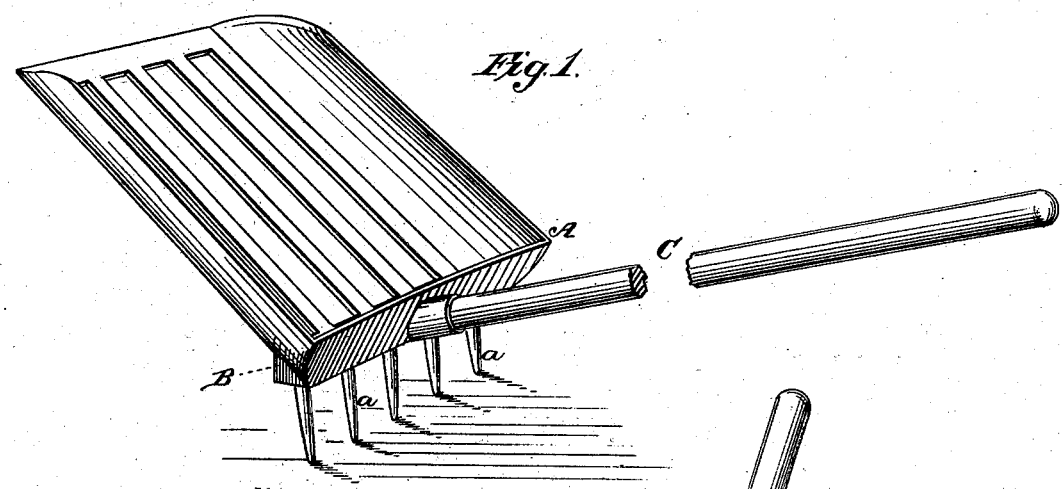
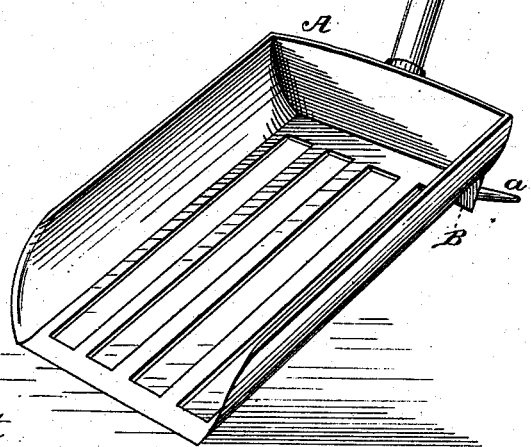
Witnesses:
Robert Everitt
E. C. Ingersoll
Inventor:
J. Stricker Bradford

UNITED STATES PATENT OFFICE.

JOHN S. BRADFORD, OF WASHINGTON, DISTRICT OF COLUMBIA.

IMPLEMENT FOR GATHERING POTATOES.

SPECIFICATION forming part of Letters Patent No. 240,650, dated April 26, 1881.

Application filed October 13, 1880. (Model.)

*To all whom it may concern:*

Be it known that I, JOHN STRICKER BRADFORD, of the city of Washington and District of Columbia, have invented a new, useful, and Improved Implement for Gathering Potatoes, of which the following is a specification.

It is well known that the gathering of potatoes from the ground by hand involves the necessity of continued stooping—an unnatural and distressing position for performing the labor. It has long been customary to dislodge the potatoes from the earth by the use of the plow or cultivator preparatory to gathering them; but no efficient method has heretofore been discovered or adopted by which the stooping operation in gathering them by hand has been superseded.

To remedy this defect and supply this want is the object of my invention; and to this end it consists in a combined hand-scoop and rake, as is hereinafter more fully set forth.

Figure 1 is a perspective view of my improved implement when in use as a rake. Fig. 2 is a similar view of the implement when in use as a scoop.

A represents the scoop, preferably having a slotted bottom. To the inner end of the scoop is an inclined handle, C, and to the bottom of the scoop, at its inner end, is attached the rake-head B, having prongs or tines $a\ a$.

The rake-head is preferably rigidly attached to the scoop-bottom; but it may be secured thereto by a spring-hinge, so that the rake may be folded back when operating the scoop.

The relative angles of the scoop A, rake-tines $a\ a$, and handle C are such that the scoop is elevated and out of the way in the operation of raking, and in the process of scooping the rake-tines will not interfere with that operation.

What I claim as my invention, and desire to secure by Letters Patent, is—

1. The combined scoop and rake, constructed substantially as described, and for the purpose set forth.

2. The combination, with the scoop A, of the rake B, with tines $a\ a$ and handle C, formed at angle with each other, so as to secure unimpeded use of the tool as a separate implement, whether as scoop or rake, substantially as described, and for the purpose set forth.

J. STRICKER BRADFORD.

Witnesses:
 ROBERT EVERETT,
 E. C. INGERSOLL.